US012659908B2

(12) United States Patent
Chen et al.

(10) Patent No.: US 12,659,908 B2
(45) Date of Patent: Jun. 16, 2026

(54) METHOD AND SYSTEM FOR THREE DIMENSIONAL POSITIONING IN SUBWAY CONSTRUCTION SITE, AND MEDIUM

(71) Applicant: China Railway Engineering Services Co., Ltd., Chengdu (CN)

(72) Inventors: Ke Chen, Chengdu (CN); Suimei Liu, Chengdu (CN); Yuanliang Tan, Chengdu (CN); Youxing Wu, Chengdu (CN); Mengliu Yang, Chengdu (CN); Xiang Liu, Chengdu (CN); Longguan Zhang, Chengdu (CN); Kaifu Li, Chengdu (CN); Zhaohua Liu, Chengdu (CN); Qibin Wang, Chengdu (CN)

(73) Assignee: China Railway Engineering Services Co., Ltd., Chengdu (CN)

( * ) Notice: Subject to any disclaimer, the term of this patent is extended or adjusted under 35 U.S.C. 154(b) by 559 days.

(21) Appl. No.: 18/258,987

(22) PCT Filed: Sep. 28, 2021

(86) PCT No.: PCT/CN2021/121465
§ 371 (c)(1),
(2) Date: Jun. 22, 2023

(87) PCT Pub. No.: WO2023/035341
PCT Pub. Date: Mar. 16, 2023

(65) Prior Publication Data
US 2024/0300555 A1      Sep. 12, 2024

(30) Foreign Application Priority Data

Sep. 8, 2021      (CN) .......................... 202111046982.4
Sep. 8, 2021      (CN) .......................... 202111047019.8
Sep. 8, 2021      (CN) .......................... 202111047030.4

(51) Int. Cl.
*H04W 64/00* (2009.01)
*H04W 4/02* (2018.01)
(Continued)

(52) U.S. Cl.
CPC ........... *H04W 64/00* (2013.01); *H04W 4/021* (2013.01); *H04W 4/023* (2013.01); *H04W 4/029* (2018.02)

(58) Field of Classification Search
CPC ..... H04W 64/00; H04W 4/021; H04W 4/023; H04W 4/029; B61L 23/06; B61L 25/026; E21F 17/18
See application file for complete search history.

(56) References Cited

U.S. PATENT DOCUMENTS

2024/0089363 A1* 3/2024 Xue ................... H04M 1/72457
2024/0094006 A1* 3/2024 Chen ..................... H04W 12/71
2024/0338905 A1* 10/2024 Luo ........................ A63F 13/577

FOREIGN PATENT DOCUMENTS

CN      108217463 A      6/2018
CN      108716918 A      10/2018
(Continued)

OTHER PUBLICATIONS

Long et al.; "Multi-source Localization with Binary Sensor Networks;" Journal on Communications; vol. 32; No. 10; Oct. 2011; pp. 158-165 (8 pages).

(Continued)

*Primary Examiner* — Dhaval V Patel
(74) *Attorney, Agent, or Firm* — Osha Bergman Watanabe & Burton LLP

(57) ABSTRACT

A method for 3D positioning in a subway construction site. The method includes: establishing a 3D coordinate system corresponding to a shaft area, and determining a coordinate of each UWB base station set in different layers of the shaft (Continued)

area; ranging a positioning label through each UWB base station; filtering and discarding error data from the ranging data; dividing the 3D coordinate system into a plurality of equal cube grids, selecting a preset number of UWB base stations from the set UWB base stations based on the filtered result, and determining a position record of the positioning label in each cube grid in turn based on coordinates of the selected UWB base stations and corresponding ranging data, and the center point coordinate of each cube grid; and determining a conclusion coordinate of the positioning label by voting based on the position record of each cube grid.

20 Claims, 6 Drawing Sheets

(51) Int. Cl.
  *H04W 4/021*        (2018.01)
  *H04W 4/029*        (2018.01)

(56)                References Cited

FOREIGN PATENT DOCUMENTS

CN          108877296  A        11/2018
CN          112938768  A        6/2021

OTHER PUBLICATIONS

Office Action issued in Chinese Application No. 202111046982.4, mailed on Oct. 13, 2021 (19 pages).
Office Action issued in Chinese Application No. 202111047019.8 mailed on Oct. 13, 2021 (16 pages).
Office Action issued in Chinese Application No. 202111047030.4, mailed on Oct. 13, 2021 (17 pages).
International Search Report issued in Application No. PCT/CN2021/121465, mailed on Mar. 29, 2022 (5 pages).
Written Opinion issued in Application No. PCT/CN2021/121465, mailed on Mar. 29, 2022 (3 pages).

* cited by examiner establishing a 3D coordinate system corresponding to a shaft area of the subway construction site, setting a corresponding number of ultra wideband (UWB) base stations in different layers of the shaft area respectively, and determining coordinates of each of the UWB base stations — S101 ranging a positioning label through each of the UWB base stations, sending ranging data to a master base station for gathering — S102 filtering and discarding error data from the gathered original distance data — S103 dividing the 3D coordinate system into a plurality of equal cube grids, determining a center point coordinate of each of the cube grids, selecting a preset number of UWB base stations from the set base stations based on the filtered result, and determining a position record of the positioning label in each of the cube grids in turn based on coordinates of the selected UWB base stations, the corresponding ranging data, and the center point coordinate of each of the cube grids — S104 determining a conclusion coordinate of the positioning label by voting based on the position record of each of the cube grids — S105

FIG. 1

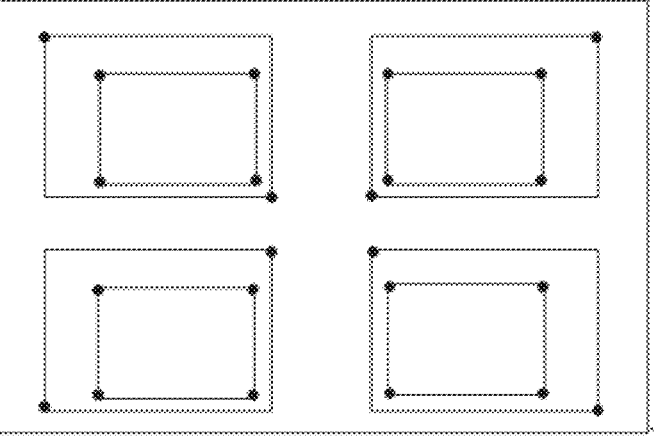

FIG. 2 base
station A

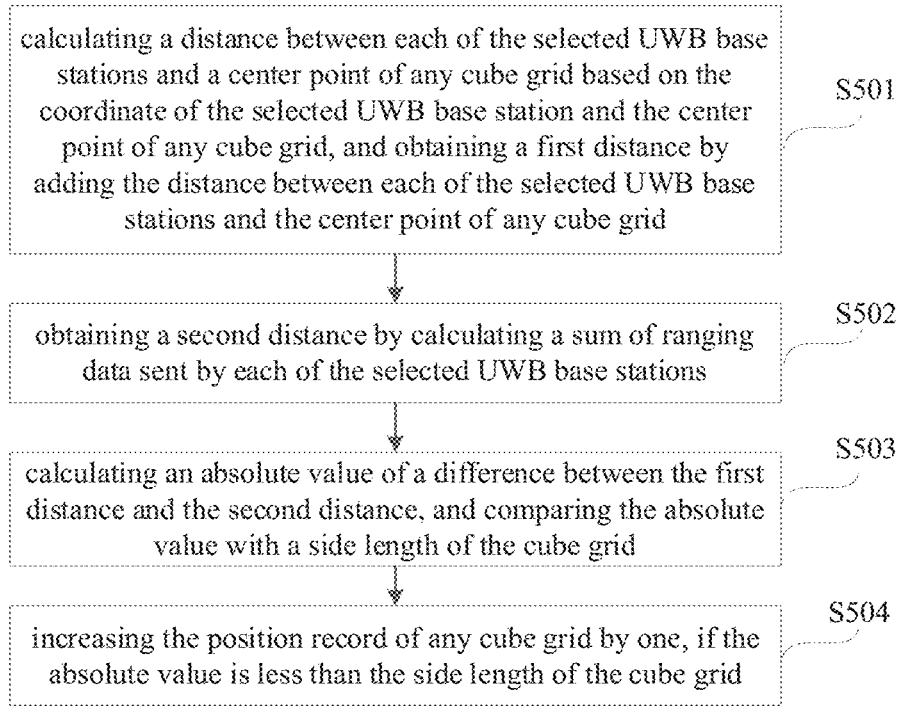

calculating a distance between each of the selected UWB base stations and a center point of any cube grid based on the coordinate of the selected UWB base station and the center point of any cube grid, and obtaining a first distance by adding the distance between each of the selected UWB base stations and the center point of any cube grid — S501 obtaining a second distance by calculating a sum of ranging data sent by each of the selected UWB base stations — S502 calculating an absolute value of a difference between the first distance and the second distance, and comparing the absolute value with a side length of the cube grid — S503 increasing the position record of any cube grid by one, if the absolute value is less than the side length of the cube grid — S504

FIG. 5

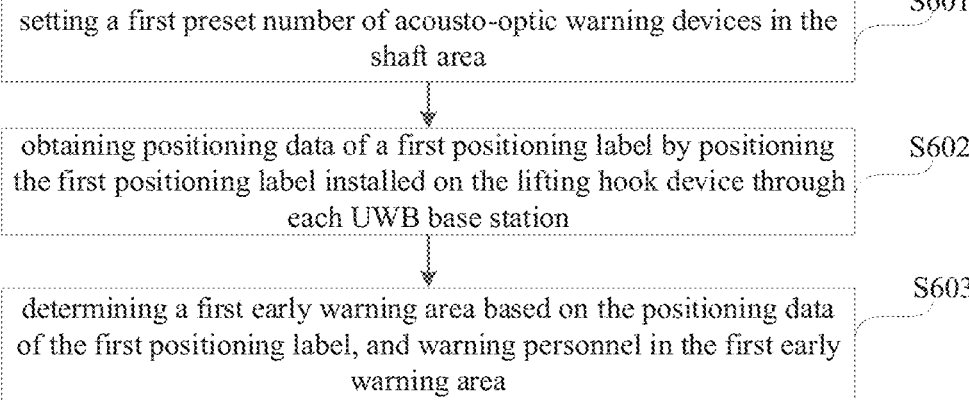

setting a first preset number of acousto-optic warning devices in the shaft area — S601 obtaining positioning data of a first positioning label by positioning the first positioning label installed on the lifting hook device through each UWB base station — S602 determining a first early warning area based on the positioning data of the first positioning label, and warning personnel in the first early warning area — S603

FIG. 6 first safe
hoister 10 first safe hoister 20

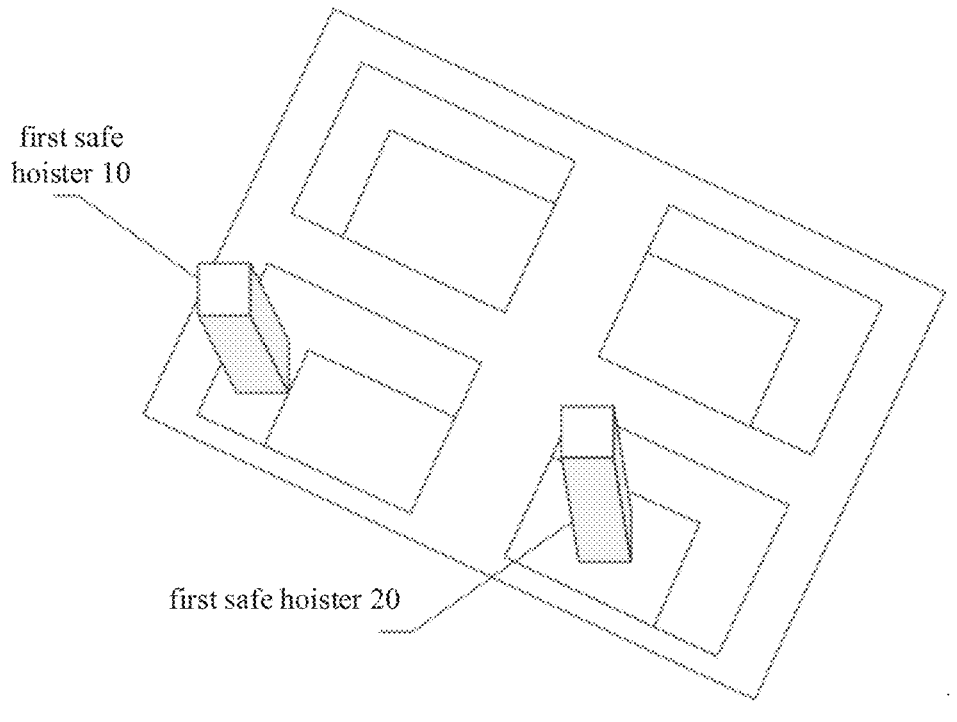

FIG. 7

| determining by a smart construction site system, a personnel label and an identifier (ID) of an acousto-optic warning device in the dynamic early warning area and feeding back to a positioning engine system | S801 |

| controlling by the positioning engine system, the acousto-optic warning device in the dynamic warning area to warn | S802 |

| sending by the positioning engine system, warning information to the personnel label | S803 |

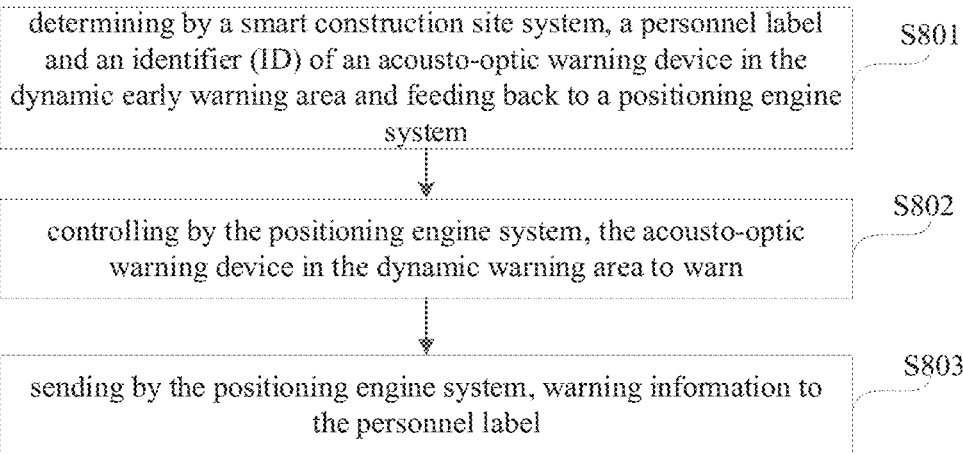

FIG. 8

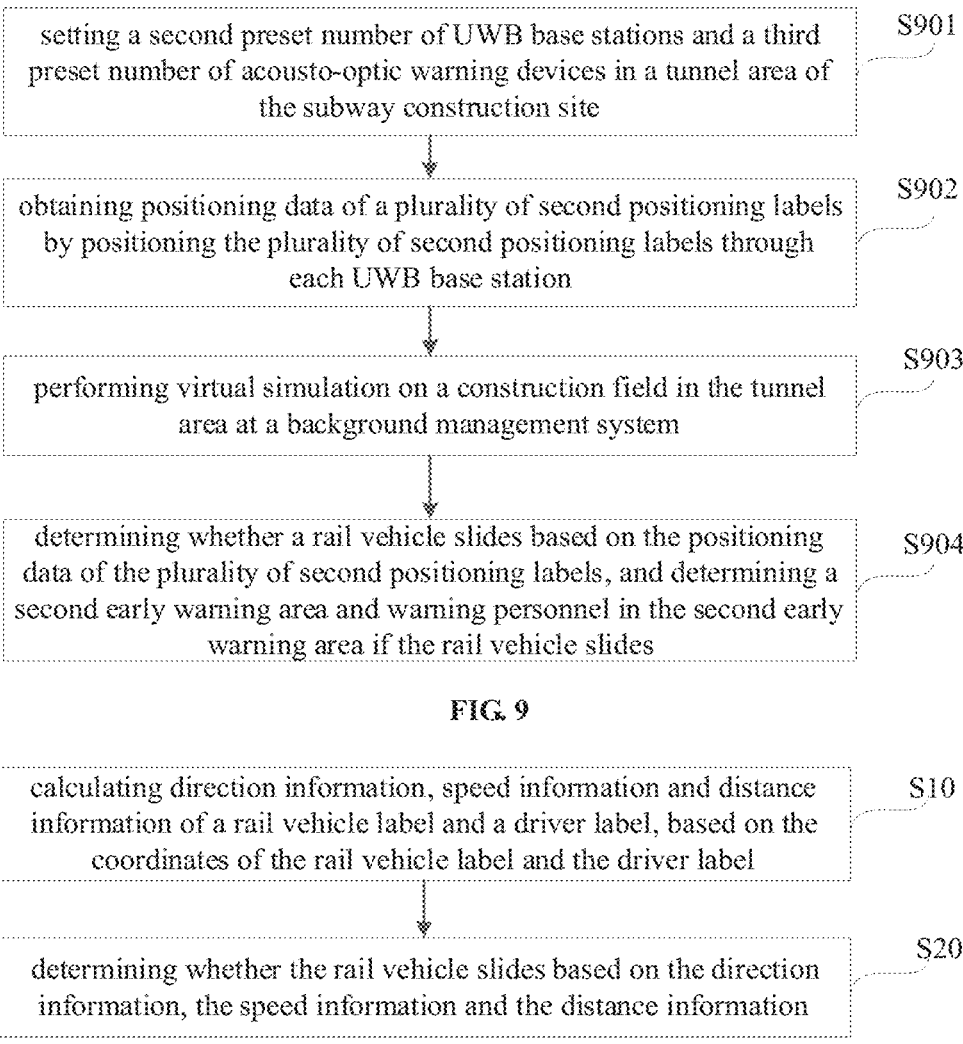

setting a second preset number of UWB base stations and a third preset number of acousto-optic warning devices in a tunnel area of the subway construction site — S901 obtaining positioning data of a plurality of second positioning labels by positioning the plurality of second positioning labels through each UWB base station — S902 performing virtual simulation on a construction field in the tunnel area at a background management system — S903 determining whether a rail vehicle slides based on the positioning data of the plurality of second positioning labels, and determining a second early warning area and warning personnel in the second early warning area if the rail vehicle slides — S904

FIG. 9 calculating direction information, speed information and distance information of a rail vehicle label and a driver label, based on the coordinates of the rail vehicle label and the driver label — S10 determining whether the rail vehicle slides based on the direction information, the speed information and the distance information — S20

METHOD AND SYSTEM FOR THREE DIMENSIONAL POSITIONING IN SUBWAY CONSTRUCTION SITE, AND MEDIUM

CROSS-REFERENCE TO RELATED APPLICATION

This application is the U.S. national phase application of International Application No. PCT/CN2021/130457, filed on Nov. 12, 2021, which claims a priority of Chinese patent application No. 202111047019.8 filed on Sep. 8, 2021, a priority of Chinese patent application No. 202111047030.4 filed on Sep. 8, 2021 and a priority of Chinese patent application No. 202111046982.4 filed on Sep. 8, 2021 the entire disclosures of which is incorporated herein by reference.

TECHNICAL FIELD

This application relates to a field of indoor three-dimensional (3D) positioning detection technology, in particular to a method and a system for 3D positioning in a subway construction site and a medium.

BACKGROUND

At present, within various construction sites, especially in a shaft area of a subway tunnel construction site, positioning of a production personnel and a device are a major focus on personnel safety management. The various early-warning events in the subway tunnel construction site needs positioning of the production personnel and the device as a basis. Therefore, there is more and more demand to position the production personnel and the device in the whole shaft area of the construction site.

SUMMARY

According to a first aspect of the disclosure, a method for 3D positioning in a subway construction site is provided. The method includes: establishing a 3D coordinate system corresponding to a shaft area of the subway construction site, setting a number of ultra wideband (UWB) base stations in different layers of the shaft area, and determining a coordinate of each of the UWB base stations; obtaining ranging data by performing ranging on a positioning label through each of the UWB base stations, sending the ranging data to a master base station; filtering and discarding error data from the ranging data; dividing the 3D coordinate system into a plurality of equal cube grids, determining a center point coordinate of each of the cube grids, selecting a preset number of UWB base stations from the set UWB base stations based on the filtered result, and determining a position record of the positioning label in each of the cube grids in turn based on coordinates of the selected UWB base stations and ranging data corresponding to the selected UWB base stations, and the center point coordinate of each of the cube grids; and determining a conclusion coordinate of the positioning label by voting based on the position record of each of the cube grids.

According to a second aspect of the disclosure, a system for 3D positioning in a subway construction site is provided. The system includes: a processor and a memory configured to store computer instructions executable by the processor. When the computer instructions are executed by the processor, the processor is configured to: establish a 3D coordinate system corresponding to a shaft area of the subway construction site, set a number of UWB base stations in different layers of the shaft area, and determine coordinates of each of the UWB base stations; obtain ranging data by performing ranging on a positioning label through each of the UWB base stations, sending the ranging data to a master base station; filter and discard error data from the ranging data; divide the 3D coordinate system into a plurality of equal cube grids, determine a center point coordinate of each of the cube grids, select a preset number of UWB base stations from the set base stations based on the filtered result, and determine a position record of the positioning label in each of the cube grids in turn based on coordinates of the selected UWB base stations and ranging data corresponding to the selected UWB base stations, and the center point coordinate of each of the cube grids; and determine a conclusion coordinate of the positioning label by voting based on the position record of each of the cube grids.

According to a third aspect of the disclosure, a non-transitory computer-readable storage medium having computer instructions stored is provided. The computer instructions are configured to cause a computer to execute the method for 3D positioning in a subway construction site according to the first aspect of the embodiments of the disclosure.

Additional aspects and advantages of the disclosure may be given in part in the following description, and some may become apparent from the following description, or learned from the practice of the disclosure.

BRIEF DESCRIPTION OF THE DRAWINGS

The above-mentioned and/or additional aspects and advantages of the disclosure will become apparent and easy to understand from the following description of embodiments in combination with the accompanying drawings, wherein:

FIG. 1 is a schematic flowchart of a method for 3D positioning in a subway construction site according to an embodiment of the disclosure;

FIG. 2 is a schematic diagram of a setting mode of a UWB base station in the shaft area according to an embodiment of the disclosure;

FIG. 5 is a schematic flowchart of a specific method for 3D positioning in a shaft of the subway construction site according to the embodiment of the disclosure;

FIG. 6 is a schematic flowchart of a method for early warning a safe hoisting based on UWB positioning according to the embodiment of the disclosure;

FIG. 7 is a schematic diagram of a specific mode of setting the safe hoisting according to the embodiment of the disclosure;

FIG. 8 is a schematic flowchart of a specific method of warning personnel in a warning area according to the embodiment of the disclosure;

FIG. 9 is a schematic flowchart of a method for early warning a sliding rail vehicle based on UWB positioning according to the embodiment of the disclosure;

FIG. 10 is a schematic flowchart of a specific method for judging whether a rail vehicle is sliding according to the embodiment of the disclosure;

DETAILED DESCRIPTION

Figure 3:
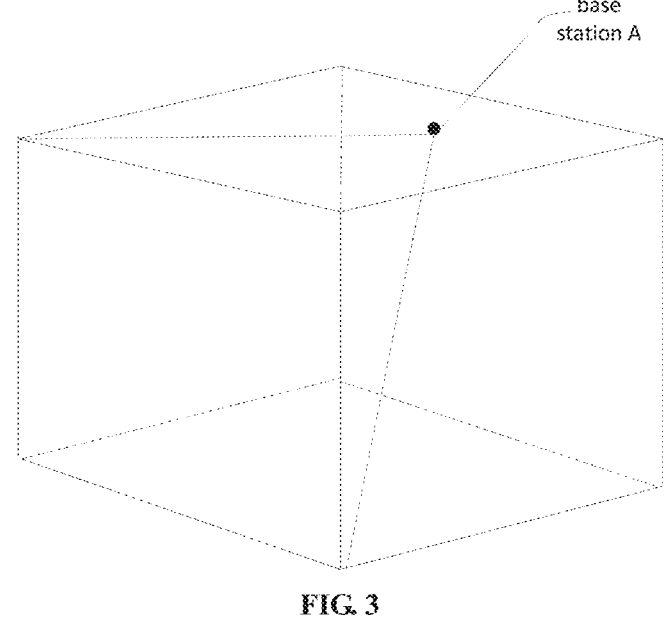
FIG. 3 is a schematic diagram of determining a distance between the UWB base station and each vertex of the shaft area according to an embodiment of the disclosure.

The embodiments of the disclosure are described in detail below. The examples of the embodiments are shown in the drawings, in which the same or similar labels throughout the drawings represent the same or similar elements or elements with the same or similar functions. The embodiments described below with reference to the accompanying drawings are exemplary and are intended to be used to explain the disclosure, but cannot be understood as a limitation of the disclosure.

In the related art of various positioning techniques, the ultra-wide band (UWB) technology is a wireless communication mode where data is transmitted with a nanosecond non-sinusoidal narrow pulse. This technology achieves positioning based on distance measurement by using a mode of high bandwidth and fast pulse, and has the advantages of high precision, low power consumption, easy deployment, strong anti-interference. Compared with other technologies where received signal strength indication (RSSI) is used for positioning, the technology has wider applicability and high precision.

However, there are the following defects in a system for UWB positioning established in the environment of the subway production plant. Firstly, it is difficult to realize 3D space display with UWB technology in a 3D environment. For a multi-layer 3D environment such as the shaft area, positioning may be only performed at each layer separately, and cannot be performed across multiple layers. Secondly, there are multiple occlusion and accidental occlusion due to the complex construction site environment in practical application, which lead to signal reflection and abnormal data acquisition, and may lead to incorrect positioning results. Therefore, on the basis that positioning of the production personnel and the device cannot meet the requirements, the early-warning system in the subway construction site cannot raise an early-warning timely and accurately, which is not conducive to the safety of production personnel.

It should be noted that the method for 3D positioning in a subway construction site in the embodiment of the disclosure may be executed by a system for 3D positioning in a subway construction site proposed by the disclosure. The system may be implemented in software and/or hardware. The system may be configured in an electronic device, which may include but not limited to a terminal, a server side, etc.

The method and system for 3D positioning in a subway construction site in the embodiments of the disclosure may be described below with reference to the drawings.

FIG. 1 is a schematic flowchart of a method for 3D positioning in a subway construction site according to an embodiment of the disclosure. As shown in FIG. 1, the method includes the following steps.

At S101: a 3D coordinate system corresponding to a shaft area of the subway construction site is established, a corresponding number of ultra wideband (UWB) base stations are set in different layers of the shaft area, respectively, and a coordinate of each of the UWB base stations is determined.

The number of UWB base stations set in each layer of the shaft area may be determined according to factors such as requirements for the 3D positioning precision and the estimated costs, and more than four visible base stations are ensured at each position in each layer (that is, each position may be covered by more than four UWB base stations), so as to meet the basic requirements of 3D positioning. The specific setting method is not limited here.

In an embodiment of the disclosure, if the shaft area in a tunnel of the subway construction site includes three layers (i.e., a top layer, a middle plate layer and a lower layer) and four windows are set at the corresponding positions of each layer, as an example shown in FIG. 2, a set of diagonal corners may be selected in each window of the top layer, a UWB base station may be set at each selected corner, and a UWB base station may be set at each corner of each window of the middle plate layer. That is, 8 sets are set at the top layer (i.e., the ground floor) and 16 sets are installed at the middle plate floor. Therefore, when the UWB base station is not set at the lower layer, it is achieved that more than four visual base stations are available at each position of the three layers, which saves costs on the basis of satisfying accurate 3D positioning.

In a specific implementation, an origin is first set in the shaft area and a XYZ 3D coordinate system corresponding to the shaft area is established based on the origin. The method of setting an origin may be determined according to actual needs, such as taking a center point of the shaft area as the origin, or taking a vertex at the lower left corner of the shaft area as the origin. Then, after the corresponding number of UWB base stations are set in different layers of the shaft area in the above way, the coordinate of each base station in the established coordinate system is determined. As a possible implementation, for each of the installed UWB base stations, a precise coordinate of the base station in the coordinate system may be determined through laser ranging or cross calculation.

At S102: ranging of a positioning label is performed through each of the UWB base stations, and ranging data is sent to a master base station for gathering.

The positioning label is a device that may interact with the UWB base station and may be set on personnel or devices to be positioned. For example, the positioning label may be set on a safety helmet of the construction personnel. Alternatively, the positioning label may be set on a head of a hoisting equipment in the shaft area. In the disclosure, coordinates of the positioning labels are approximate to coordinates of the personnel or devices to be located. The 3D positioning of the personnel or devices is realized by determining the coordinates of the positioning labels in the 3D coordinate system corresponding to the shaft area.

The set UWB base station includes the master base station and a slave base station. The master base station may communicate with a device such as a switch to transmit data measured by each UWB base station.

Specifically, each of the set UWB base stations measures a distance between the base station and the positioning label by sending a non-sinusoidal narrow pulse signal to the positioning label. Then, each UWB base station outputs the measured distance (that is, ranging data) between the base station and the positioning label to the master base station for gathering.

It should be noted that, in the embodiment of the disclosure, multiple positioning labels may be positioned at the same time, that is, when there are multiple positioning labels to be positioned, each UWB base station may range each positioning label at the same time, and then locate each positioning label separately according to the corresponding ranging data of each positioning label.

At S103: error data is filtered from the gathered original distance data and the error data is discarded.

After the master base station gathers the ranging data transmitted by each base station, the master base station obtains the original distance data measured by each UWB base station, and may transmit the original distance data through the switch to a background device for subsequent calculation, for example, to an edge computing layer of the system for 3D positioning in the embodiment of the disclosure.

The error data is wrong distance data measured by the UWB base station. For example, after the signal sent by the UWB base station is reflected by the obstacle, the measured distance from the positioning label is greater than the actual distance. For example, when the positioning label is not in the shaft area, the distance from the positioning label measured by the UWB base station is the wrong distance data.

When filtering error data, in an embodiment of the disclosure, it may be first determined that a maximum threshold of accurate ranging data that may be measured by each UWB base station in the shaft area. As an example shown in FIG. 3, a distance between each UWB base station and each vertex of the shaft area is determined according to the coordinate of the base station and each vertex of the shaft area, and each distance is compared to take the maximum distance as the maximum threshold of accurate ranging data that may be measured by the current base station. Then, the ranging data transmitted by each UWB base station is compared with the maximum distance corresponding to each base station. If the ranging data transmitted by any UWB base station is greater than the maximum distance corresponding to the UWB base station, the current ranging data of the UWB base station is then determined as the error data.

At S104: the 3D coordinate system is divided into a plurality of equal cube grids, a center point coordinate of each cube grid is determined, a preset number of UWB base stations is selected from the set base stations based on the filtered result, a position record of the positioning label in each cube grid is determined in turn based on coordinates of the selected UWB base stations, the corresponding ranging data, and the center point coordinate of each cube grid.

The position record indicates a probability that a position of the positioning label is in the current cube grid. The number of selected UWB base stations is determined according to coordinates of the positioning labels that may be accurately determined. For example, when the probability that the positioning label is located in each cube grid may be determined according to data of three UWB base stations, the three base stations are selected from all the set base stations.

Figure 4:
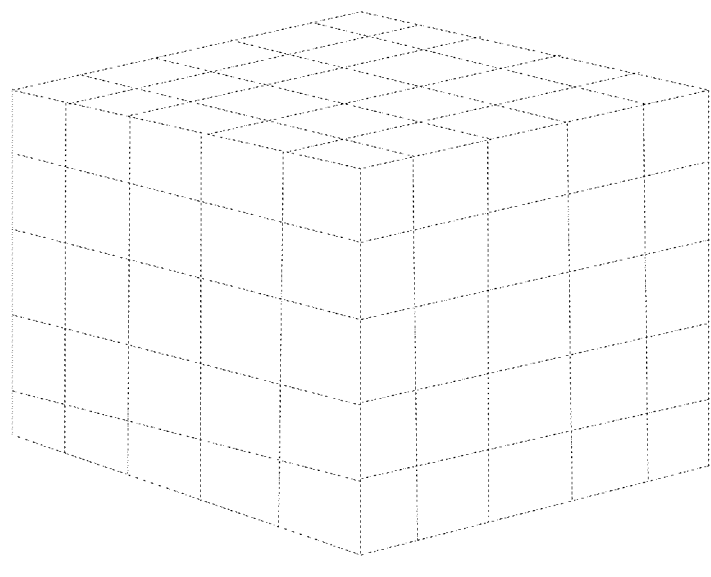
FIG. 4 is a schematic diagram of dividing the shaft area according to the embodiment of the disclosure.

In an embodiment of the disclosure, as shown in FIG. 4, the 3D coordinate system is first divided into a plurality of equal cube grids, in which a side length and number of cube grids may be determined according to a length of the coordinate axis and the positioning precision. For example, the 3D coordinate system is divided into a plurality of cube grids with a side length of 10 cm, and a center point coordinate of each divided cube grid are determined. Then, take the filtered ranging data as input, that is, after removing base stations that have transmitted the error data, a preset number of UWB base stations is selected from all the remaining base stations, and coordinates of the selected UWB base stations in the coordinate system are determined. According to the coordinates of the selected base stations and the center point coordinate of each cube grid, a distance from the selected base stations to the center point of each cube grid is calculated, and the distance is compared with the input ranging data to determine the position record of the positioning label in each cube grid.

At S105: a conclusion coordinate of the positioning label is determined by voting based on the position record of each of the cube grids.

In an embodiment of the disclosure, after the position record of the positioning label in each cube grid is determined, the cube grid where the positioning label is located is determined by voting in combination with parameters such as the position record of each cube grid, a historical voting success record of each cube grid, and historical positioning coordinates of the positioning label.

Specifically, after a voting module in the system for 3D positioning in the shaft of the subway construction site obtains the above parameters in the disclosure, voting on each cube grid determined in the previous step that may contain a positioning label is performed, and a cube grid having a number of votes is greater than a half number of total votes is determined as a target cube grid where the positioning label is located. That is, a single grid having more than half of the votes is of successful votes, and the center point coordinate of the target cube grid is taken as the final conclusion coordinate of the positioning label, so as to realize the 3D positioning of the positioning label in the shaft area.

Optionally, in some embodiments, if each cube grid gets less than half of the votes, a voting area may be expanded. For example, 9 adjacent cube grids in the divided multiple cube grids may be accumulated to generate a cube voting area whose side length is 3 times of the original cube grids, so that multiple voting areas may be obtained after the cube grids are accumulated, and each voting area may be voted, and a center point coordinate of a voting area with the highest number of votes is taken as the conclusion coordinate of the positioning label.

It should be noted that, after the conclusion coordinate of the positioning label is determined through the above steps, the conclusion coordinate of the positioning label may also be displayed in the shaft of the subway construction site, so that other personnel may know the position where the positioning label is located or an early warning is given. As an example, the conclusion coordinate of the positioning label that may be determined is sent to a smart construction site system in the shaft area, and the 3D coordinate of the positioning label is displayed on a display screen of the smart construction site system.

To sum up, the method for 3D positioning in the shaft of the subway construction site in the embodiment of the disclosure, establishes a 3D coordinate system corresponding to the shaft area of the subway construction site, and sets a corresponding number of UWB base stations in different layers of the shaft, respectively. Ranging of positioning labels is performed by each UWB base station. Error data is filtered and discarded from the gathered data. The 3D coordinate system is divided into multiple equal square grids, and a position record of the positioning label in each cube grid is determined in turn according to the coordinate of the selected UWB base station and the corresponding ranging data, as well as a center point coordinate of each cube grid. The conclusion coordinate of the positioning label is determined by voting according to the position record of each grid. The method filters and votes each sampling area according to the UWB high-precision positioning data, to obtain the coordinates of the labels to be positioned, which may perform positioning in the overall 3D space of the shaft. That is, unified positioning may be performed when the personnel and equipment are in different layers of the shaft, it is achieved the effect of seamless coverage in the whole shaft area, and the locatable area is expanded. Furthermore, the influence of actual factors such as obstacle occlusion signals on positioning is reduced, and the positioning accuracy is improved.

In order to more clearly explain the specific implementation of determining the position record of the positioning label in each cube grid in the disclosure, a specific method for 3D positioning in the shaft of the subway construction site is also proposed in the disclosure.

FIG. 5 is a schematic flowchart of a specific method for 3D positioning in a shaft of the subway construction site according to the embodiment of the disclosure. Referring to FIG. 5, the method includes the following steps.

At S501: a distance between each of the selected UWB base stations and a center point of any cube grid is calculated based on the coordinate of the selected UWB base station and the center point of any cube grid, and a first distance is obtained by adding the distance between each of the selected UWB base stations and the center point of any cube grid.

In the embodiment of the disclosure, any cube grid is first selected from all the cube grids to determine its position record, a preset number of UWB base stations is then selected from all the set UWB base stations, the center point coordinate of the selected cube grid and coordinates of the selected UWB base stations are determined.

It should be noted that, there are multiple ways of selecting a preset number of UWB base stations from all the set UWB base stations. For each combination that may be selected, the disclosure determines the position records of the positioning labels in the current cube grid in turn. Therefore, before selecting the preset number of UWB base stations, the disclosure determines permuted combinations of the preset number of UWB base stations selected from all the set base stations, and selects any combination of the permuted combinations.

For example, taking the cube grid where the origin of the coordinate system is located as the currently selected grid 1, its coordinate is determined as (x1, y1, z1). If five base stations are set in the shaft area, and the preset number of selected base stations is 3, then there are $$C_5^3$$

selecting ways. This embodiment first selects the first combination, that is, base station A, base station B, and base station C, and determines that the coordinate of base station A is (xa, ya, za), the coordinate of base station B is (xb, yb, zb), and the coordinate of base station C a is re (xc, yc, zc).

Furthermore, the distance between each selected UWB base station and the center point of any cube grid is calculated through a distance formula between two points, and the calculated distances are then added.

With reference to the above example, a first distance between the selected UWB base station and the center point of the cube grid is calculated by the following way:

$$\sqrt{(x_1-x_a)*(x_1-x_a)+(y_1-y_a)*(y_1-y_a)+(z_1-z_a)*(z_1-z_a)} +$$
$$\sqrt{(x_1-x_b)*(x_1-x_b)+(y_1-y_b)*(y_1-y_b)+(z_1-z_b)*(z_1-z_b)} + .$$
$$\sqrt{(x_1-x_c)*(x_1-x_c)+(y_1-y_c)*(y_1-y_c)+(z_1-z_c)*(z_1-z_c)}$$

At S502: a sum of ranging data sent by each selected UWB base station is calculated to obtain a second distance.

Specifically, the ranging data sent by each selected UWB base station is obtained, that is, the distance data from the positioning label to the base station. Continuing to refer to the above example, the distance from the positioning label to base station A is La, the distance to base station B is Lb, and the distance to base station C is Lc, and the second distance is obtained by adding La, Lb, and Lc.

At S503: an absolute value of a difference between the first distance and the second distance is calculated, and the absolute value is compared with a side length of the cube grid.

At S504: the position record of any cube grid is increased by one if the absolute value is less than the side length of the cube grid.

With reference to the above example, when the side length of the divided cube grid is 10 cm, the comparison is made in the following way:

$$\left| \begin{array}{l} \sqrt{((x_1-x_a)*(x_1-x_a)+(y_1-y_a)*(y_1-y_a)+(z_1-z_a)*(z_1-z_a))} + \\ \sqrt{((x_1-x_b)*(x_1-x_b)+(y_1-y_b)*(y_1-y_b)+(z_1-z_b)*(z_1-z_b))} + \\ \sqrt{((x_1-x_c)*(x_1-x_c)+(y_1-y_c)*(y_1-y_c)+(z_1-z_c)*(z_1-z_c))} - \\ (L_a+L_b+L_c) \end{array} \right| < $$

10 cm

That is, if the above inequality is true, it is determined that the position record of the grid 1 under the combination of base station A, base station B and base station C is increased by one.

Further, after determining the current base station combination, the corresponding UWB base station is selected for each remaining combination in turn. The steps S1 to S4 are repeated to determine whether the position record of the grid 1 under each combination is increased by one. For example, for each combination of $$C_5^3$$

permuted combinations in the above example, it is determined whether the position record of the grid 1 under the combination is increased by one through the steps S1 to S4. After all the combinations are executed, the final accumulated value of the position record is counted, and the accumulated position record of the cube grid is calculated.

Therefore, according to the coordinate of the selected UWB base station and the corresponding ranging data, as well as the center point coordinate of any cube grid, the position record of the positioning label in the current cube grid is determined. Then, it is judged in the above way for each cube grid divided, and the position record of the positioning label in each cube grid is determined in turn.

The method for 3D positioning in the shaft of the subway construction site in the embodiment of the disclosure, determines the position record of the positioning label in each cube grid in turn according to the coordinate of the selected UWB base station, the corresponding ranging data, and the center point coordinate of each cube grid. The probability of the positioning label in each cube grid is reflected through the position record of the positioning label in each cube grid, which is further convenient to vote based on the calculated probability of the positioning label in each cube grid to determine the final conclusion coordinate of the positioning label. This method reduces the influence of factors such as the reflection of positioning signals caused by obstacle occlusion on the positioning results, which may improve the 3D positioning accuracy of the label when there is the influence of obstacles in practical applications, and enhance the practicability and reliability of the method for 3D positioning in the shaft of the subway construction site in the disclosure.

In some embodiments of the disclosure, according to the determined coordinates after positioning multiple positioning labels, early warning may be given to various dangerous events in the subway construction site, so as to ensure the safety of construction personnel. For example, early warning may be given to a movement of a lifting head when a safe hoister works in the shaft area, or to sliding of a rail vehicle in the tunnel. The two specific embodiments are described below.

FIG. 6 is a schematic flowchart of a method for early warning a safe hoister based on UWB positioning according to the embodiment of the disclosure. As shown in FIG. 6, the method includes the following steps.

At S601: a first preset number of acousto-optic warning devices is set in the shaft area.

It should be noted that, as shown in FIG. 7, the safety hoister in the disclosure may be a device that is set in each window of the shaft area and is configured to install and move a device to be installed, or construction materials, appliances, etc. by moving and operating between layers of the shaft area through a hook device. A plurality of safety hoisters may be set in the shaft area, a hoisting area where each safety hoister works may be determined according to the actual construction needs. For example, the area in the window shown in FIG. 7 may also cover other positions in the shaft area.

Since the safety hoisting device is located in the shaft area, a lifting hook of the safety hoister may be positioned through the UWB base station set in the shaft area as described in the above embodiment, and a warning to the hoister may be made according to the positioning results. The first preset number of acousto-optic warning devices set in the shaft area is determined according to an interval between the acousto-optic warning devices and the volume of the shaft area. For example, when a range of each early warning area is determined to be 80 meters according to the early warning accuracy requirements of early warning system, an acousto-optic warning device is set every 80 meters, and the number of acousto-optic warning devices to be installed is determined according to the size of the shaft area.

At S602: positioning data of a first positioning label is obtained by positioning the first positioning label installed on the lifting hook device through each UWB base station.

The specific implementation of positioning the first positioning label installed on the lifting hook device through the UWB base station may refer to the description of the above embodiments, which may not be repeated here.

It should be noted that, in the embodiment of the disclosure, multiple first positioning labels may be located at the same time. For example, as shown in FIG. 7, if there are a first safe hoister 10 and a second safe hoister 20 in the shaft, then each UWB base station may range each positioning label at the same time when there are two first positioning labels to be positioned, and each positioning label is positioned according to the corresponding ranging data of the positioning label.

At S603: a first early warning area is determined according to positioning data of the first positioning label, and personnel in the first early warning area is warned.

In the embodiment of the disclosure, when the safe hoister works, an area where the lifting hook device will move is first determined, and the area is the first warning area where it needs to warn the personnel in the area.

As a possible implementation, a real-time position, a travel direction and a travel speed of the positioning label are determined according to the coordinate of the positioning label. Specifically, the specific position of the lifting hook device in the shaft area may be determined according to the coordinates of the labels installed on the lifting hook device, such as a first area in the middle plate layer of the shaft, etc., and the travel direction and the travel speed of the positioning label may be calculated through changes in the coordinates of the positioning label at different times. For example, if the coordinate of the positioning label at the $1^{st}$ second are (10, 50, 100) and the coordinate of the positioning label at the 2nd second are (50, 50, 100), it may be calculated that the travel speed of the positioning label is 40 and the travel direction is along the X axis of the coordinate system.

Then, according to the current time, as well as the real-time position, the travel direction and the travel speed of the rail vehicle label, a dynamic early warning area at different times are calculated. Specifically, after the real-time position, the travel direction and the travel speed of the rail vehicle label are determined at the current time, a position to which the lifting hook device is moved along the current travel direction at a different subsequent time may be determined by a production of the speed and the time. Further, the range of influence may be divided according to the positions of the lifting hook device at different times, so as to determine the dynamic warning area at different times.

Furthermore, the personnel in the determined first warning area is warned. When the lifting hook device has not moved to the first warning area, the personnel in the area may be reminded to leave the area in advance.

As a possible implementation, as shown in FIG. 8, the embodiment of the disclosure provides a specific method of warning personnel in the warning area, which includes the following steps.

At S801: a smart construction site system determines a personnel label and an identifier (ID) of an acousto-optic warning device in the dynamic early warning area and feeds them back to a positioning engine system.

Specifically, in this embodiment, each UWB base station is connected to the positioning engine system at a computing layer through a bus and a switch of the positioning base station, each acousto-optic warning device may be connected to the positioning engine system through the switch, and the positioning engine system is connected to the smart construction site system at a service layer to achieve data transmission. The smart construction site system comprehensively analyzes coordinates of the personnel labels in various positioning labels and a coordinate of each acousto-optic warning device, screens the personnel label and the ID of the acousto-optic warning device in the dynamic warning area, and feeds them back to the position engine system.

At S802: the positioning engine system controls the acousto-optic warning device in the dynamic warning area to warn.

Specifically, the positioning engine system sends instructions to the corresponding acousto-optic warning device according to the ID of the acousto-optic warning device, and controls the acousto-optic warning device to emit audible and visual warnings to the surrounding area. For example, the acousto-optic warning device 1 and the acousto-optic warning device 2 are controlled in the dynamic early warning area to flash lights and output alarm bells.

At S803: the positioning engine system sends warning information to the personnel label.

Specifically, the position engine system sends warning commands to the positioning labels of the personnel in the dynamic warning area, so that the positioning label of the corresponding personnel is enabled to vibrate, and sends text prompts to the positioning label of the corresponding personnel or associated mobile devices.

Therefore, the personnel staying in the dangerous area for production may be informed of a track range during the movement of the lifting hook device in advance via a warning, so that the relevant personnel can make a response in advance and leave the dangerous area.

With the method of warning a safe hoister based on UWB positioning in the embodiment of the disclosure, the positioning labels installed on the lifting hook device may be positioned according to the UWB technology with high positioning precision, so that the coordinate of the lifting hook device is accurately determined, the real-time dynamic warning area may be accurately calculated when the safe hoister works, and the personnel in the dangerous area may be warned in advance, which improves the timeliness and accuracy of the safe hoister warning and further ensures the safety of personnel.

FIG. 9 is a schematic flowchart of a method for early warning a sliding rail vehicle based on UWB positioning according to the embodiment of the disclosure. As shown in FIG. 9. The method includes the following steps.

At S901: a second preset number of UWB base stations and a third preset number of acousto-optic warning devices are set in a tunnel area of the subway construction site.

The number of UWB base stations and the acousto-optic warning devices set in the tunnel area may be determined according to the requirements for the early warning accuracy and timeliness of the early warning system, as well as the estimated costs and other factors. The specific setting way is not limited here. In particular, it is necessary to ensure that each positioning label in the tunnel area may be located within a sampling coverage of three UWB base stations at the same time. That is, the same positioning label is positioned by the three UWB base stations, so as to achieve accurate positioning.

The set UWB base station includes a master base station and a slave base station. The master base station may communicate with the switch and other devices, for transmitting data measured by each UWB base station to external devices.

In an embodiment of the disclosure, according to the performance of the UWB base station, a UWB base station is set every 40 meters in the tunnel area, and an acousto-optic warning device is set every 80 meters. Then, the second preset number of the UWB base stations to be set and the third preset number of acousto-optic warning devices to be set are determined according to the length of the tunnel. The disclosure tests a radiation range of the UWB base station in an open and unobstructed area in advance, according to hardware and power characteristics, network cable transmission attenuation and other characteristics of the selected UWB base station in the disclosure, and determines an interval between the set UWB base stations according to a radiation range ratio. For example, if the radiation range of the UWB base station is 80-120 meters, the UWB base stations are installed at an interval of 40 meters when laying in the tunnel, so that the positioning label may be sampled by three base station devices within the coverage range. The interval between the acousto-optic warning devices is determined according to the accuracy requirements of the early warning system. For example, if a divided range of each early warning area is 80 meters, an acousto-optic warning device is set every 80 meters.

At S902: positioning data of a plurality of second positioning labels is obtained by positioning the plurality of second positioning labels in the tunnel area through the second preset number of UWB base stations.

The second positioning label is a device that may interact with the UWB base station and be set on the personnel or devices to be located in the tunnel. For example, the second positioning label may be a rail vehicle label set at a head position of the rail vehicle, or a driver label set on a safety helmet of a rail vehicle driver.

The position data includes a coordinate of the second positioning label and a specific position located in the tunnel area. In the disclosure, the positioning label is first positioned through the UWB base stations to obtain the coordinate of the positioning label measured by the UWB base stations. The real-time position of the positioning label may be determined according to the coordinate of the positioning label. In this embodiment, the coordinate of the positioning label is approximate to the coordinate of the person or device to be positioned.

Specifically, in an embodiment of the disclosure, when multiple positioning labels are positioned through each UWB base station in the second preset number of UWB base stations, a coordinate system corresponding to the tunnel area is first established, and the coordinate of each UWB base station in the coordinate system are determined. The coordinate system corresponding to the tunnel area may be a one-dimensional (1D) coordinate system, or a 3D coordinate system may be established according to the above way of establishing the coordinate system corresponding to the shaft area, which is not limited here. For example, an origin is set in the tunnel area, e.g., a position of a tunnel entrance, and X-axis 1D coordinate system is established based on the origin. After the UWB base stations are installed in the above ways of the embodiments, precise coordinates of the installed UWB base stations in the coordinate system are determined through laser ranging, cross calculation and other methods.

Then, each UWB base station is controlled to range the multiple positioning labels. The UWB base station measures a distance between the UWB base station itself and the positioning label by sending a non-sinusoidal narrow pulse signal to the positioning label. When there are multiple positioning labels, distance data between the UWB base station and each positioning label may be obtained separately.

Further, the coordinate of each positioning label is calculated according to the ranging data and the coordinate of each UWB base station. In the example of establishing a 1D coordinate system, after the distance between the UWB base station and the positioning label is obtained as well as the coordinate of the UWB base station, the coordinates of the positioning label may be calculated through the distance formula between two points. It should be noted that, since the same positioning label in the disclosure is positioned by three UWB base stations, it may be determined whether position results corresponding to the base stations are consistent after determining the coordinate of the current positioning label according to the measured data of each base station. If the position results corresponding to the base stations are not consistent, the final conclusion coordinate of the current positioning label may be determined by voting. Therefore, when some base station fails or is blocked by obstacles, the positioning label may still be positioned accurately, which improves the positioning accuracy and reliability.

Therefore, it may be determined the coordinates of multiple labels such as rail vehicle labels and driver labels in the tunnel area.

At S903: a construction field in the tunnel area is simulated in a background management system.

The background management system is a system that may remotely monitor the construction field and send early warning instructions. For example, it may be the smart construction site system of the subway tunnel proposed in the disclosure.

In an embodiment of the disclosure, after each UWB base station has measured the distance data, and outputs the distance data to the master base station for gathering. The master base station first transmits the distance data to the background device through the switch for calculation. For example, the distance data is sent to a positioning box embedded with a positioning engine in the background computing layer, and the positioning engine calculates the above coordinate values. Then, the calculated coordinate of each person and each device are sent to the smart construction site system. The construction field in the tunnel area is simulated in the background system according to the coordinate of each person and each device through virtual simulation technology, thus realizing the visualization of the construction field. As such, the construction monitoring personnel can observe remotely as if they are on the construction field, and all the monitoring works is performed in a visual state, ensuring the synchronization of remote monitoring to the construction field.

At S904: it is determined whether a rail vehicle slides based on the positioning data of the plurality of second positioning labels, and if the rail vehicle slides, a second early warning area is determined and personnel in the second early warning area is warned.

In the embodiment of the disclosure, whether the rail vehicle slides may be judged according to whether there is a difference between the positioning data of the rail vehicle label and the positioning data of the driver label in the plurality of positioning labels. It may be understood that, when the rail vehicle driver drives the rail vehicle under normal conditions, the positioning data of the rail vehicle label should be consistent with that of the driver label. If it is determined that there is a difference between the positioning data of the rail vehicle label and the positioning data of the driver label and the difference meets preset conditions, it may be judged that the driver is not on the rail vehicle and sliding of the rail vehicle has occurred.

Furthermore, when the rail vehicle is sliding, an area to be passed by the rail vehicle may be determined first, and the area is the second warning area where it needs to warn the personnel in the area.

As a possible implementation, a real-time position, a travel direction and a travel speed of the rail vehicle label are determined according to the coordinate of the rail vehicle label. Specifically, a specific position of the rail vehicle in the tunnel area may be determined according to the coordinate of the rail vehicle label, such as Area x. The travel direction and speed of the rail vehicle label may be calculated through changes in the coordinate of the rail vehicle label at different times. For example, if the coordinate of the rail vehicle label at the $1^{st}$ second is (10), and the coordinate of the rail vehicle label at the 2nd second is (50), the travel speed of the rail vehicle label is 40, and the travel direction is a direction away from the origin (that is, the tunnel entrance).

Then, the dynamic warning area at different times is calculated according to the current time, as well as the real-time position, the travel direction and the travel speed of the rail vehicle label. Specifically, after the real-time position, the travel direction and the travel speed of the rail vehicle label are determined at the current time, a position to which the rail vehicle is driven at a different subsequent time along the current travel direction may be determined by a production of the speed and the time. Further, the range of influence may be divided according to the positions of the rail vehicle at different times, so as to determine the dynamic warning area at different times. When the rail vehicle has not slid to the early warning area, the personnel in the area may be reminded to leave the area in advance. The specific warning can refer to the warning method in the above embodiment of safety hoister warning, which may not be repeated here.

Therefore, the track range of the sliding process of the rail vehicle may be notified to the personnel staying in the dangerous area in advance, so that the relevant personnel can make responses in advance and leave the dangerous area.

It should be noted that, the method for early warning a sliding rail vehicle based on UWB positioning in the embodiment of the disclosure, may also be applied to the early warning when the rail vehicle driver drives the rail vehicle forward, the early warning method of which may refer to the above description of the early warning of the sliding vehicle. The early warning range is reduced on the premise that the vehicle is controllable, and the impact on construction is thus reduced on the basis of ensuring the safety of personnel.

With the method for early warning a sliding rail vehicle based on UWB positioning in the embodiment of the disclosure, multiple positioning labels (such as rail vehicle labels and driver labels) are positioned according to the UWB technology with high positioning precision, it may be judged in time when the rail vehicle slides according to the positioning data and the real-time dynamic warning area is calculated, which is convenient for early warning to the personnel in the dangerous area and improves the timeliness of early warning the sliding rail vehicle. The visualization of the construction field in the tunnel is also realized through virtual simulation, which is conducive to the implementation of monitoring works and further ensures the safety of personnel.

In order to more clearly explain the specific implementation of judging whether the rail vehicle is sliding in the embodiments of the disclosure, the disclosure also proposes a specific method for judging whether the rail vehicle is sliding.

FIG. 10 is a schematic flowchart of a specific method for judging whether a rail vehicle is sliding according to the embodiment of the disclosure. Referring to FIG. 10, the method includes the following steps.

At S10: direction information, speed information and distance information of a rail vehicle label and a driver label are calculated according to a coordinate of the rail vehicle labels and a coordinate of the driver label.

Specifically, according to the changes in the coordinate of the rail vehicle label and the coordinate of the driver label measured by the UWB base station at different times, the travel direction and speed of the rail vehicle label, as well as the direction information and the speed information of the driver label, may be calculated. The specific calculation method may refer to the example of determining the travel direction and speed of the rail vehicle label at S104, which will not be repeated here. Then, the specific positions of the rail vehicle label and the driver label in the tunnel area may be determined according to the coordinate of the rail vehicle label and the coordinate of the driver label. Then, a distance between the rail vehicle label and the driver label may be calculated by subtracting the position of the rail vehicle from the position of the driver.

At S20: it is judged whether the rail vehicle is sliding according to the direction information, the speed information and the distance information.

Specifically, according to the calculated direction information, speed information and distance information of the rail vehicle label and the driver label, it is judged whether there is a difference between the rail vehicle label and the driver label, to determine whether the driver is on the rail vehicle. As an example, when it is determined that any one or more cases occurs: a speed difference between the rail vehicle label and the driver label is greater than a set threshold, or the rail vehicle label and the driver label have different travel directions, or a position distance between the rail vehicle label and the driver label is gradually offset, it is determined that the driver is not driving the rail vehicle at present.

Furthermore, if the speed of the rail vehicle label is greater than a set speed threshold, it is determined that when the driver is not on the rail vehicle, i.e., the rail vehicle has generated an unexpected movement, and it is then judged that the rail vehicle has slid.

The method for early warning a sliding rail vehicle based on UWB positioning in the embodiment of the disclosure may judge whether the rail vehicle is sliding according to the UWB positioning data with high precision, may timely judge when the rail vehicle is sliding and calculate the real-time dynamic early warning area, which is convenient for early warning to personnel in the dangerous area, and improves the timeliness of early warning the sliding rail vehicle.

Figure 11:
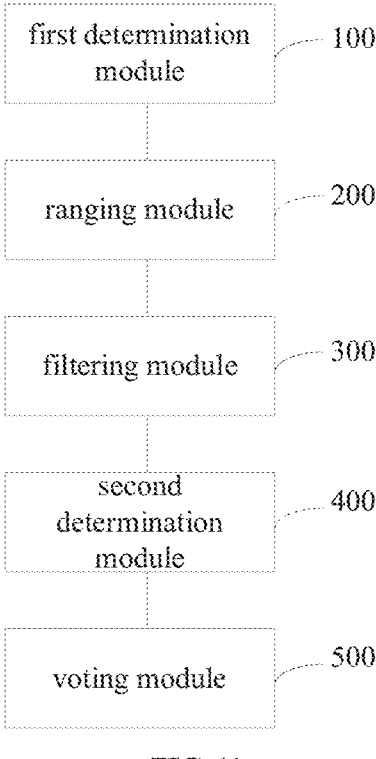
FIG. 11 is a structural diagram of a system for 3D positioning in a subway construction site according to the embodiment of the disclosure.

FIG. 11 is a structural diagram of a system for 3D positioning in a subway construction site according to the embodiment of the disclosure.

As shown in FIG. 11, the system for 3D positioning in a subway construction site includes: a first determination module 100, a ranging module 200, a filtering module 300, a second determination module 400, and a voting module 500.

a first determination module 100 is configured to establish a 3D coordinate system corresponding to a shaft area of the subway construction site, set a corresponding number of UWB base stations in different layers of the shaft area respectively, and determine coordinates of each of the UWB base stations.

a ranging module 200 is configured to range a positioning label through each of the UWB base stations, sending ranging data to a master base station for gathering;

a filtering module 300 is configured to filter error data from the gathered original distance data and discard the error data.

a second determination module 400 is configured to divide the 3D coordinate system into a plurality of equal cube grids, determine a center point coordinate of each of the cube grids, select a preset number of UWB base stations from the set base stations based on the filtered result, and determine a position record of the positioning label in each of the cube grids in turn based on coordinates of the selected UWB base stations, the corresponding ranging data, and the center point coordinate of each of the cube grids.

a voting module 500 is configured to determine a conclusion coordinate of the positioning label by voting based on the position record of each of the cube grids.

In the embodiment of the disclosure, the system for 3D positioning in an iron shaft of the construction site includes a field data acquisition layer and an edge computing layer. The field data acquisition layer may include a UWB base station, a switch, the first determination module 100 and the ranging module 200 described above. The edge computing layer includes a positioning engine system and a smart construction site system. The positioning engine system receives the distance data transmitted by a master base station, performs position calculation of the system, stores and distributes the results. After the position data is processed by the position engine system, 3D coordinates of the personnel and devices are transmitted to the smart construction site system. Finally, the 3D coordinates of the personnel and devices are displayed in the smart construction site system, as well as specific positions of the shaft field where the personnel and devices are located. The position engine system may include the filtering module 300, the second determination module 400 and the voting module 500 as described above.

In some embodiments of the disclosure, the second determination module 400 is specifically configured to calculate a distance between each of the selected UWB base stations and a center point of any cube grid based on a coordinate of the selected UWB base station and a center point coordinate of any cube grid, and obtain a first distance by adding the distance between each of the selected UWB base stations and the center point of any cube grid; calculate a sum of ranging data sent by each selected UWB base station to obtain a second distance; calculate an absolute value of a difference between the first distance and the second distance, and compare the absolute value with a side length of the cube grid; increase the position record of any cube grid by one if the absolute value is less than the side length of the cube grid.

In some embodiments of the disclosure, the second determination module 400 is specifically configured to: determine each permuted combination of the selected preset number of UWB base stations from the set base stations, select the corresponding UWB base stations in turn for each combination, repeat the above steps and determine whether the position record of any cube grid under each combination is increased by one; calculate the increased position record of any cube grid.

In some embodiments of the disclosure, the voting module 500 is specifically configured to: vote on a cube grid where the positioning label is located, in combination with the position record of each of the cube grids; determine a cube grid with a number of votes being greater than a half number of total votes as a target cube grid where the positioning label is located; take a center point coordinate of the target cube grid as the conclusion coordinate of the positioning label.

In some embodiments of the disclosure, the voting module 500 is specifically configured to: if the number of votes for each cube grid is less than the half number of total votes, multiple voting areas are obtained by accumulating 9 adjacent cube grids, each of the voting areas is voted and a center point coordinate of a voting area with the highest number of votes is determined as the conclusion coordinate of the positioning label.

In some embodiments of the disclosure, the shaft area includes a top layer and a middle plate layer. The first determination module 100 is specifically configured to: select a set of diagonal corners in each window of the top layer, and setting a UWB base station at each of the selected corners; and set a UWB base station at each corner of each window of the middle board layer.

In some embodiments of the disclosure, the filtering module 300 is specifically configured to: determine a maximum distance from distances between any UWB base station and each vertex of the shaft area; compare ranging data transmitted by any UWB base station with the maximum distance; if the ranging data transmitted by any UWB base station is greater than the maximum distance, determine that the ranging data is the error data.

In some embodiments of the disclosure, the positioning label includes a first positioning label installed on a lifting hook device in a hoister. The system also includes a safe hoister early warning module, configured to set a first preset number of acousto-optic warning devices in the shaft area; and determine a first early warning area based on positioning data of the first positioning label, and warn personnel in the first early warning area.

In some embodiments of the disclosure, the safety hoister early warning module is specifically configured to determine a real-time position, a travel direction and a travel speed of the first positioning label based on a coordinate of the first positioning label; and calculate a dynamic early warning area at different times based on a current time, the real-time position, the travel direction and the travel speed of the first positioning label.

In some embodiments of the disclosure, the system also includes a rail vehicle sliding early warning module, configured to: set a second preset number of UWB base stations and a third preset number of acousto-optic warning devices in a tunnel area of the subway construction site; obtain positioning data of a plurality of second positioning labels by positioning the plurality of second positioning labels in the tunnel area through the second preset number of UWB base stations; perform virtual simulation on a construction field in the tunnel area at a background management system; and determine whether a rail vehicle slides based on the positioning data of the plurality of second positioning labels, and determining a second early warning area and warning personnel in the second early warning area if the rail vehicle slides.

In some embodiments of the disclosure, the rail vehicle sliding early warning module is also configured to: establish a coordinate system corresponding to the tunnel area, and determining a coordinate of each UWB base station within the coordinate system in the tunnel area; control each UWB base station in the tunnel area to range the plurality of second positioning labels; and calculate a coordinate of each second positioning label based on ranging data and the coordinate of each UWB base station in the tunnel area.

In some embodiments of the disclosure, the rail vehicle sliding early warning module is also configured to: calculate direction information, speed information and distance information of the rail vehicle labels and the driver labels, based on coordinates of the rail vehicle labels and the driver labels; and determine whether the rail vehicle slides based on the direction information, the speed information and the distance information of the rail vehicle labels and the driver labels.

In some embodiments of the disclosure, the rail vehicle sliding early warning module is also configured to: determine the real-time position, the travel direction and the travel speed of the rail vehicle labels based on the coordinates of the rail vehicle labels; and calculate a dynamic early warning area at different times based on a current time, and the real-time position, the travel direction and the travel speed of the rail vehicle labels.

In some embodiments of the disclosure, the safety hoister early warning module and the rail vehicle sliding early warning module are also configured to: control acousto-optic warning devices in the dynamic warning area to warn; and send warning signals to positioning labels of personnel located in the dynamic warning area.

The system for 3D positioning in the shaft of the subway construction site in the embodiment of the disclosure establishes a 3D coordinate system corresponding to the shaft area, determines the coordinates of the UWB base stations set in different layers of the shaft. Ranging of positioning labels is performed by each UWB base station. Error data is filtered and discarded from the gathered data. The 3D coordinate system is divided into multiple equal square grids, and a position record of the positioning label in each cube grid is determined in turn according to the coordinate of the selected UWB base station and the corresponding ranging data, as well as a center point coordinate of each cube grid. The conclusion coordinate of the positioning label is determined by voting according to the position record of each grid. The system filters and votes each sampling area divided according to the UWB high-precision positioning data, to obtain the coordinates of the labels to be positioned, which may perform positioning in the overall 3D space of the shaft. That is, unified positioning may be performed when the personnel and equipment are in different layers of the shaft, it is achieved the effect of the seamless coverage in the whole shaft area, and the locatable area is expanded. Furthermore, the influence of actual factors such as obstacle occlusion signals on positioning is reduced, and the positioning accuracy is improved. In addition, according to the positioning data, it can timely judge the dynamic warning area when the rail vehicle slides and the lifting hook moves, which is convenient for early warning to the personnel in the dangerous area, and improves the timeliness of early warning in the subway construction site. The visualization of the construction field in the tunnel is realized through virtual simulation, which is conducive to the implementation of monitoring work and further ensures the safety of personnel.

In order to realize the above embodiments, the present disclosure also proposes a non-transitory computer-readable storage medium having stored computer instructions. The computer instructions are configured to cause a computer to execute the method for 3D positioning in a subway construction site described in any of the above embodiments.

It should be understood that, each part of the disclosure may be implemented in hardware, software, firmware, or their combination. In the above embodiments, a plurality of steps or methods may be implemented by software or firmware that is stored in memory and executed by a suitable instruction execution system. For example, if it is implemented by hardware, as in another embodiment, it may be implemented by any one of the following technologies known in the art or their combination: discrete logic circuits with logic gate circuits for realizing logic function on data signals, special integrated circuits with suitable combined logic gate circuits, programmable gate arrays (PGAs), field programmable gate arrays (FPGAs), etc.

In addition, in the description of the disclosure, the orientation or position relationship indicated by the terms "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial" "circumferential" or the like is based on the orientation or position relationship shown in the figures, which is only for the convenience of describing the disclosure and simplifying the description, rather than indicating or implying that the device or element referred to must have a specific orientation, and must be constructed and operated in a specific orientation, which cannot be understood as a limitation of the disclosure.

In addition, the terms "first" and "second" are only used for description purposes and cannot be understood as indicating or implying relative importance or implicitly indicating the number of indicated technical features. Thus, the features defined as "first" and "second" can explicitly or implicitly include at least one such feature. In the description of the disclosure, "multiple/a plurality of" means at least two, such as two, three, etc., unless otherwise specifically defined.

In the disclosure, unless otherwise specified and defined, the terms "install", "connect", "joint", "fix" and other terms should be understood in a broad sense, for example, they may be fixed connection, removable connection or integrated; they may be mechanical connection or electrical connection; they may be direct connection or indirect connection through an intermediate medium; they may be an internal connection between two elements or an interaction between two elements, unless otherwise specified. For those skilled technicians in the art, the specific meaning of the above terms in the disclosure may be understood according to the specific situation.

In the disclosure, unless otherwise specified and defined, the first feature "above" or "below" the second feature may be a direct contact between the first and second features, or an indirect contact between the first and second features through an intermediate medium. Moreover, the first feature "on", "over" and "above" the second feature may mean that the first feature is just over or above the second feature, or may only mean that the horizontal height of the first feature is higher than the second feature. The first feature "under", "underneath" and "below" the second feature may mean that the first feature is just under or below the second feature, or may simply mean that the horizontal height of the first feature is lower than the second feature.

In the description of this specification, reference to the description of the terms "an embodiment", "some embodiments", "examples", "specific examples", or "some examples" means that the specific features, structures, materials, or features described in combination with this embodiment or example are included in at least one embodiment or example of the disclosure. In this specification, the exemplary expressions of the above terms do not need to be directed to the same embodiments or examples. Furthermore, the specific features, structures, materials, or features described may be combined in an appropriate manner in any one or more embodiments or examples. In addition, those skilled in the art may combine and incorporate different embodiments or examples described in this specification and the characteristics of different embodiments or examples without contradiction.

Although the embodiments of the disclosure have been shown and described above, it may be understood that the above embodiments are exemplary and cannot be understood as restrictions on the disclosure. Those skilled in the art may make changes, modifications, replacements, and transformations to the above embodiments within the scope of the disclosure.

The invention claimed is:

1. A method for three-dimensional (3D) positioning in a subway construction site, performed by an electronic device, the method comprising:
    establishing a 3D coordinate system corresponding to a shaft area of the subway construction site, setting a number of ultra wideband (UWB) base stations in different layers of the shaft area, and determining a coordinate of each of the UWB base stations;
    obtaining ranging data by performing ranging on a positioning label through each of the UWB base stations, sending the ranging data to a master base station;
    filtering and discarding error data from the ranging data;
    dividing the 3D coordinate system into a plurality of equal cube grids, determining a center point coordinate of each of the cube grids, selecting a preset number of UWB base stations from the set UWB base stations based on the filtered result, and determining a position record of the positioning label in each of the cube grids in turn based on coordinates of the selected UWB base stations and, ranging data corresponding to the selected UWB base stations, and the center point coordinate of each of the cube grids; and
    determining a conclusion coordinate of the positioning label by voting based on the position record of each of the cube grids.

2. The method according to claim 1, wherein determining the position record of the positioning label in each of the cube grids in turn comprises:
    S1: calculating a distance between each of the selected UWB base stations and a center point of any cube grid based on a coordinate of the selected UWB base station and a center point coordinate of any cube grid, and obtaining a first distance by adding the distance between each of the selected UWB base stations and the center point of any cube grid;
    S2: obtaining a second distance by calculating a sum of ranging data sent by each of the selected UWB base stations;
    S3: calculating an absolute value of a difference between the first distance and the second distance, and comparing the absolute value with a side length of the cube grid; and
    S4: increasing the position record of any cube grid by one, in response to the absolute value being less than the side length of the cube grid.

3. The method according to claim 2, wherein determining the position record of the positioning label in each of the cube grids in turn further comprises:
    determining each permuted combination of the preset number of UWB base stations selected from the set UWB base stations, selecting a UWB base station in turn for each permuted combination, repeating steps S1 to S4 and determining whether the position record of any cube grid under each permuted combination is increased by one; and
    calculating the increased position record of any cube grid.

4. The method according to claim 1, wherein voting based on the position record of each of the cube grids comprises:
    voting on a cube grid where the positioning label is located, in combination with the position record of each of the cube grids;
    determining a cube grid with a number of votes being greater than a half number of total votes as a target cube grid of the positioning label; and
    taking a center point coordinate of the target cube grid as the conclusion coordinate of the positioning label.

5. The method according to claim 4, further comprising:
in response to determining that the number of votes for each cube grid is less than the half number of total votes, obtaining a plurality of voting areas by accumulating 9 adjacent cube grids, voting each of the voting areas and determining a center point coordinate of a voting area with a maximum number of votes as the conclusion coordinate of the positioning label.

6. The method according to claim 1, wherein the shaft area comprises a top layer and a middle plate layer, and setting the number of UWB base stations in different layers of the shaft area, comprises:
selecting a set of diagonal corners in each window of the top layer, and setting a UWB base station at each of the selected diagonal corners; and
setting a UWB base station at each diagonal corner of each window of the middle plate layer.

7. The method according to claim 1, wherein filtering the error data from the ranging data, comprises:
determining a maximum distance from distances between any UWB base station and each vertex of the shaft area;
comparing ranging data sent by any UWB base station with the maximum distance;
in response to determining that the ranging data sent by any UWB base station is greater than the maximum distance, determining that the ranging data is the error data.

8. The method according to claim 1, wherein the positioning label comprises a first positioning label installed on a lifting hook device in a safe hoister, and determining the conclusion coordinate of the positioning label by voting based on the position record of each of the cube grids comprises:
setting a first preset number of acousto-optic warning devices in the shaft area; and
determining a first early warning area based on positioning data of the first positioning label, and warning personnel in the first early warning area.

9. The method according to claim 8, wherein determining the first early warning area comprises:
determining a real-time position, a travel direction and a travel speed of the first positioning label based on a coordinate of the first positioning label; and
calculating a dynamic early warning area at different times based on a current time, the real-time position, the travel direction and the travel speed of the first positioning label.

10. The method according to claim 1, comprising:
setting a second preset number of UWB base stations and a third preset number of acousto-optic warning devices in a tunnel area of the subway construction site;
obtaining positioning data of a plurality of second positioning labels by positioning the plurality of second positioning labels in the tunnel area through the second preset number of UWB base stations;
performing virtual simulation on a construction field in the tunnel area at a background management system; and
determining whether a rail vehicle slides based on the positioning data of the plurality of second positioning labels, and determining a second early warning area and warning personnel in the second early warning area in response to determining that the rail vehicle slides.

11. The method according to claim 10, wherein positioning the plurality of second positioning labels in the tunnel area through the second preset number of UWB base stations comprises:

establishing a coordinate system corresponding to the tunnel area, and determining a coordinate of each UWB base station in the tunnel area within the coordinate system;
controlling each UWB base station in the tunnel area to perform ranging on the plurality of second positioning labels; and
calculating a coordinate of each of the second positioning labels based on ranging data and a coordinate of each UWB base station in the tunnel area.

12. The method according to claim 10, wherein the plurality of second positioning labels comprise rail vehicle labels and driver labels, and determining whether the rail vehicle slides based on the positioning data of the second positioning labels comprises:
calculating direction information, speed information and distance information of the rail vehicle labels and the driver labels, based on coordinates of the rail vehicle labels and coordinates of the driver labels; and
determining whether the rail vehicle slides based on the direction information, the speed information and the distance information of the rail vehicle labels and the driver labels.

13. The method according to claim 10, wherein determining the second early warning area comprises:
determining the real-time position, the travel direction and the travel speed of the rail vehicle labels based on the coordinates of the rail vehicle labels; and
calculating a dynamic early warning areas at different times based on a current time, and the real-time position, the travel direction and the travel speed of the rail vehicle labels.

14. The method according to claim 8, wherein warning the personnel in the first warning area includes:
controlling acousto-optic warning devices in the dynamic warning area to warn; and
sending warning signals to positioning labels of personnel located in the dynamic warning area.

15. A system for three-dimensional (3D) positioning in a subway construction site, comprising:
a processor; and
a memory configured to store computer instructions executable by the processor;
wherein when the computer instructions are executed by the processor, the processor is configured to:
establish a 3D coordinate system corresponding to a shaft area of the subway construction site, set a number of ultra wideband (UWB) base stations in different layers of the shaft area, and determine coordinates of each of the UWB base stations;
obtain ranging data by performing ranging on a positioning label through each of the UWB base stations, send the ranging data to a master base station;
filter and discard error data from the ranging data;
divide the 3D coordinate system into a plurality of equal cube grids, determine a center point coordinate of each of the cube grids, selecting a preset number of UWB base stations from the set UWB base stations based on the filtered result, and determine a position record of the positioning label in each of the cube grids in turn based on coordinates of the selected UWB base stations and, ranging data corresponding to the selected UWB base stations, and the center point coordinate of each of the cube grids; and
determine a conclusion coordinate of the positioning label by voting based on the position record of each of the cube grids.

16. A non-transitory computer-readable storage medium having computer instructions stored thereon, wherein the computer instructions are configured to cause a computer to execute a method for three-dimensional (3D) positioning in a subway construction site, the method comprising:

establishing a 3D coordinate system corresponding to a shaft area of the subway construction site, setting a number of ultra wideband (UWB) base stations in different layers of the shaft area, and determining coordinates of each of the UWB base stations;

obtaining ranging data by performing ranging on a positioning label through each of the UWB base stations, sending the ranging data to a master base station;

filtering and discarding error data from the ranging data;

dividing the 3D coordinate system into a plurality of equal cube grids, determining a center point coordinate of each of the cube grids, selecting a preset number of UWB base stations from the set UWB base stations based on the filtered result, and determining a position record of the positioning label in each of the cube grids in turn based on coordinates of the selected UWB base stations and ranging data corresponding to the selected UWB base stations, and the center point coordinate of each of the cube grids; and determining a conclusion coordinate of the positioning label by voting based on the position record of each of the cube grids.

17. The system according to claim 15, wherein the processor is further configured to:

S1: calculate a distance between each of the selected UWB base stations and a center point of any cube grid based on a coordinate of the selected UWB base station and a center point coordinate of any cube grid, and obtain a first distance by adding the distance between each of the selected UWB base stations and the center point of any cube grid;

S2: obtain a second distance by calculating a sum of ranging data sent by each of the selected UWB base stations;

S3: calculate an absolute value of a difference between the first distance and the second distance, and compare the absolute value with a side length of the cube grid; and S4: increase the position record of any cube grid by one, in response to the absolute value being less than the side length of the cube grid.

18. The system according to claim 17, wherein the processor is further configured to:

determine each permuted combination of the preset number of UWB base stations selected from the set UWB base stations, select a UWB base station in turn for each permuted combination, repeating steps S1 to S4 and determine whether the position record of any cube grid under each permuted combination is increased by one; and calculate the increased position record of any cube grid.

19. The system according to claim 15, wherein the processor is further configured to:

vote on a cube grid where the positioning label is located, in combination with the position record of each of the cube grids;

determine a cube grid with a number of votes being greater than a half number of total votes as a target cube grid of the positioning label; and take a center point coordinate of the target cube grid as the conclusion coordinate of the positioning label.

20. The system according to claim 19, wherein the processor is further configured to:

in response to determining that the number of votes for each cube grid is less than the half number of total votes, obtain a plurality of voting areas by accumulating 9 adjacent cube grids, vote each of the voting areas and determine a center point coordinate of a voting area with a maximum number of votes as the conclusion coordinate of the positioning label.

* * * * *